(12) United States Patent
Simkin et al.

(10) Patent No.: US 6,505,088 B1
(45) Date of Patent: Jan. 7, 2003

(54) ELECTRONIC CONTROLLER

(75) Inventors: David Simkin, Cupertino, CA (US);
Aaron Simkin, Cupertino, CA (US);
Andrew J. Schneider, Cupertino, CA (US); John Bayer, Cupertino, CA (US)

(73) Assignee: Mental Models, Inc., Cupertino, CA (US)

( * ) Notice: Subject to any disclaimer, the term of this patent is extended or adjusted under 35 U.S.C. 154(b) by 0 days.

(21) Appl. No.: 09/520,022

(22) Filed: Mar. 7, 2000

(51) Int. Cl.[7] .................................................. G09G 5/08
(52) U.S. Cl. ........................................ 700/85; 345/163
(58) Field of Search ...................... 700/83–85; 710/73; 345/163–166, 649, 650

(56) References Cited

U.S. PATENT DOCUMENTS

| | | | | |
|---|---|---|---|---|
| 5,367,631 A | * | 11/1994 | Levy | 395/162 |
| 5,528,265 A | * | 6/1996 | Harrison | 345/158 |
| 5,754,168 A | * | 5/1998 | Maynard, Jr. | 345/163 |
| 5,936,612 A | * | 8/1999 | Wang | 345/164 |
| 6,115,028 A | * | 9/2000 | Balakrishnan et al. | 345/157 |
| 6,249,274 B1 | * | 6/2001 | Svancarek et al. | 345/158 |

FOREIGN PATENT DOCUMENTS

WO    WO-8601319 A1  *  2/1986

* cited by examiner

Primary Examiner—Paul P. Gordon
(74) Attorney, Agent, or Firm—Raymond E. Roberts; Intellectual Property Law Office

(57) ABSTRACT

An electronic controller (10) having one or two rotational position detectors (48), a tilt/shake sensor (50), and optional press controls (18). A user may rotate control knobs (14) causing the position detectors (48) to create rotation signals (80) from which the amount of rotation can be resolved and the direction of rotation detected. Tilting or shaking of the electronic controller (10) causes the tilt/shake sensor (50) to create a tilt/shake signal (84), and pressing (or releasing) the press controls (18) can create press signals (82). A processor system (46) processes and integrates all of these signals (80, 82, 84) into a data signal (86) which is communicated over a communications interface (16) to a computerized device or system employing the electronic controller (10) as an input device or system.

16 Claims, 5 Drawing Sheets

Functional Block Diagram

Circuit Board Configuration

Position Detector

Functional Block Diagram

ELECTRONIC CONTROLLER

TECHNICAL FIELD

The present invention relates generally to computer operator interface processing systems, and more particularly to electrical control devices which permit an operator to input data for selectively control of a computerized system. It is anticipated that primary application of the present invention will be in the control of personal computers and network communications enabled devices.

BACKGROUND ART

Various input systems already exist for users to input data for the control of computerized devices. However, many new systems are developed and introduced every year and this serves to illustrate how completely suitable input systems for all purposes still do not exist.

One of the first such systems was the simple keyboard, which permits entry of alpha-numeric data, but with only the most basic of cursor positioning commands. These were promptly extended to include various positioning keys, first to position within text display screens, then within textual data representations extending beyond the immediate screen, then within graphics data display screens, and further to within graphics displays that also extend beyond the immediate screen. The conventional personal computer keyboard with its up, down, left and right arrow keys, and its page up, page down, end, and home keys is an example of the result of this evolution. However, keyboards remain an incomplete solution.

Which input system came next may be debated, but unquestionably the most widely used today is the mouse. The mouse is particularly popular for use with graphics and in graphical user interfaces (GUI), although its inventor, Doug Engelbart, first demonstrated its utility in simple word processing. Variations of the mouse exist and are also popular, such as the trackball, which is essentially an up-side down mouse. However, the mouse and its variants also remain an incomplete solution.

Another popular class of input systems includes joysticks and gaming controllers. This class is large and reconciling relationship between some of its diverse members can be difficult. But again, and particularly here, the shear quantity of members in this class of input systems and the shear variety which it encompasses serve to illustrate the fact that we are still uncomfortable with the input systems we presently have.

Before discussing some particular problems with existing input systems it can be helpful to summarize the current needs of such systems. An input system for a computerized device may be called upon to input very simple, even primitive, forms of manual instruction. Alternately, such a system may be required to operate with very complex computerized devices and larger systems which those computerized devices are, in turn, part of. An input system may need to input simple state changes, such as YES-NO, ON-OFF, TRUE-FALSE, etc. Or it may need to input complex continuous ranges of data representing, for instance, linear and angular values of direction and magnitude. Within the "spaces" which a computerized device can create, movements in one to six degrees of freedom must be controlled with such input devices. And as computerized devices themselves have become more powerful due to our recent and growing ability to network them together, our demands and expectations of input systems have also increased.

One problem which remains today is how to enable a user to move an input focus on a graphical user interface (perhaps connected to the Internet) in both the horizontal and vertical dimensions simultaneously and independently. Most past and current attempts to do this make use of the existing input systems, such as keyboards and mice. However, cursor keys do not allow for continuous and simultaneous movement in any respect. And mice only allow for simultaneous, but not independent, vertical and horizontal movement. What has particularly been missed with the mouse solution is the ability to move in the horizontal and vertical dimensions independently. One reason this was missed was that the tasks these devices were being designed for simply did not require this feature.

Another problem remaining today is how to represent fractional changes in electronic objects in computerized displays in a manner that more closely maps to the real world. One way that this is accomplished today is by requiring the user to enter a number (like 90 for a 90 degree rotation) and to have the computer show the fractional portion of the whole. Another way is to click on the "handle" of an object and rotate it, like with the free rotate tool of PowerPoint (™ Microsoft Corporation, Redmond, Wash.). However, this solution does not closely map to the real world experience of rotating an object. It is not a natural, easy way to represent changes to the parts of a whole (for example, volume control, radio tuning, dimming of a light switch, temperature changes on a thermostat, clock movements, steering wheel turns, changing proportions on a pie graph, etc.). Also, some objects that one can import cannot be rotated or flipped with this approach because they don't have a "handle" that was created by the software program employing them.

Representing the shaking of electronic objects in a manner that more closely maps to the real world is also a problem remaining today. The way this is commonly accomplished today by requiring the user to click on a button that causes the shaking to occur. However, in the real world shaking does not happen that way; it is a physical movement where a hard object is shaken. For example, the shaking of a pair of dice.

Adding a level of skill and amusement to certain operations such as computer freehand drawing, the playing of games that require the use of a knob, and the playing of games that require shaking of objects are also characteristics removed from many existing input systems. The way this is often accomplished today is with cursor keys or a mouse, which can be very precise even when that is not desirable. Little skill is required to perform many functions with such existing input systems. For example, shapes are often predetermined to make drawing simple. One selects a circle object with a mouse and then places it into the drawing area; one does not actually draw the circle. However, in the real world, drawing, shaking and turning are physical activities. Drawing a straight line or drawing a circle takes skill in the real world, and this is not duplicated with a mouse or cursor key.

To reduce the hand-eye coordination requirements of a mouse or other traditional input device is quite difficult, and usually appears awkwardly contrived. Current systems (like Microsoft Paint, Adobe Illustrator, and Adobe Photoshop) require significant hand-eye coordination with a mouse or other traditional input device. But a mouse is difficult to control and there have been many studies that have addressed this issue. The problem is not easily solved, however, because a mouse moves across a surface with no constraints other than surface space. This makes operating mice and related input systems especially difficult for very young children, the elderly, the disabled, and computer novices.

Accordingly what are needed is a new input system for computerized applications, one which may replace existing input systems in some roles and supplement existing input systems in other roles.

DISCLOSURE OF INVENTION

Accordingly, it is an object of the present invention to provide a system to enable a user to move an input focus in a graphical user interface in the horizontal and vertical dimensions simultaneously and independently.

Another object of the invention is to provide a system to represent continuous, fractional changes in electronic objects in a manner that more closely maps to the real world.

Another object of the invention is to provide a system to represent the shaking of electronic objects in a manner that also more closely maps to the real world.

And another object of the invention is to provide a system to add a level of skill and amusement to certain operations such as computer freehand drawing, the playing of games and the inputting of data that require the use of one or more knobs, and the playing of games and the inputting of data that requires the shaking of objects, or combinations of these.

Briefly, one preferred embodiment of the present invention is a controller for a user to selectively control a computerized system. The controller includes a housing in which at least one control knob is rotatably mounted and suitable for the user to rotate with either of their hands. Contained within the housing are at least one position detector and each control knob causes a respective position detector to produce a rotation signal. Also contained within the housing is a tilt sensor for sensing tilting of the housing and producing a tilt signal when the user tilts the controller. Optionally, in some embodiments the tilt sensor may also sense shaking of the housing. A communications interface is further included in the controller to communicate a data signal from the controller to the computerized system. And a processor system contained within the housing is suitable for receiving each rotation signal, determining from it a respective rotation amount, integrating that rotation amount into the data signal, determining from the tilt signal whether any tilting has occurred and also integrating an indication of that into the data signal, and directing the communications interface to communicate the data signal from the controller to the computerized system.

Briefly, an alternate preferred embodiment of the present invention is a method for a user to selectively control a computerized system with a controller. The method includes the steps of sensing tilting of the controller and producing a tilt signal responsive there to when the user tilts the controller; and then communicating that tilt signal to the computerized system as a data signal from the controller. Optionally, in some embodiments the tilt signal may also be produced by sensing shaking of the controller.

Briefly, another alternate preferred embodiment of the present invention is a method for a user to selectively control a program running in a computerized system. The method includes the steps of sensing tilting (and optionally shaking) of a controller and producing a tilt signal responsive there to when the user tilts the controller. The tilt signal is then transmitted to the computerized system as a data signal from said controller, and the computerized system receives the data signal from the controller and instructs the program to perform actions in response to that.

An advantage of the present invention is that it may have multiple knobs that can be used simultaneously and independently in a fun and entertaining way, yet it reduces demand on a user for hand-eye coordination, as compared with a mouse or other traditional input device. For example, it may be used to easily rotate and distort objects in a drawing. By turning knobs at various speeds and in various directions simultaneously and independently, many variations in diagonal lines are possible. Or it can easily represent changes to the parts of a whole (for example, changes in volume, radio tuning, dimming of a light switch, temperature changes on a thermostat, clock movements, steering wheel turns, changing proportions on a pie graph, etc.).

Another advantage of the invention is that it can realistically employ functions such as tilting and shaking for use as input to computerized devices in manners not previously possible, such as the shaking of dice or the changing a kaleidoscope. In particular, using the invention the action of shaking may be used to request erasing of a computerized device screen. Such physical action is intuitive and common outside of the computer context, particularly among children and people generally engaged in amusing or highly emotive activities.

Another advantage of the invention is that it adds a level of skill and amusement to games, yet it is intuitive to use and young children, the elderly, computer novices, and the disabled may readily adapt to its use.

And another advantage of the invention is that it can be used a wide range of computerized devices, including stand-alone personal computers (PCs), terminals, workstations, network computers, and particularly distributed computer systems extending across global networks like the Internet These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
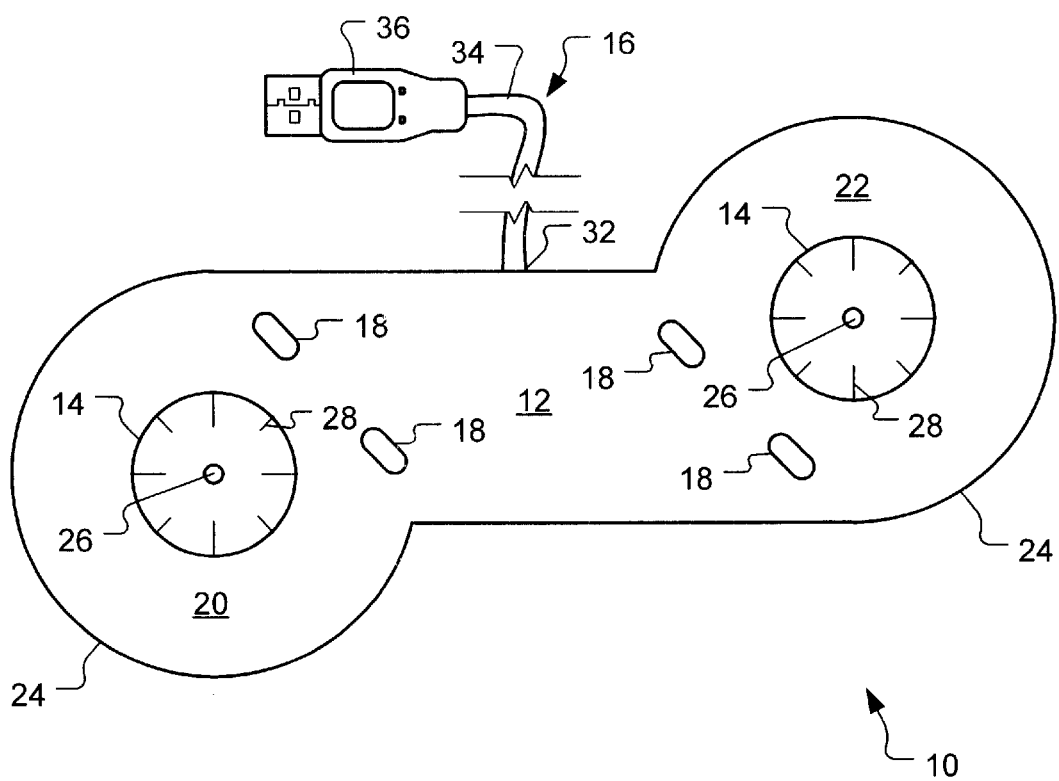
FIG. 1 is a top plan view of an electronic controller according to the present invention.

A preferred embodiment of the present invention is an electronic controller for a human operator to selectively interface with and control a computerized processing system having a display. As illustrated in the various drawings herein, and particularly in the view of FIG. 1, a form of this preferred embodiment of the inventive device is depicted by the general reference character 10.

FIG. 1 is a top plan view of an electronic controller 10 according to the present invention. The electronic controller 10 includes a housing 12, a pair of control knobs 14, and a communications interface 16. The electronic controller 10 optionally, also includes one or more press controls 18, with four present in the embodiment shown in FIG. 1.

The housing 12 may, also optionally, be generally symmetrical in the manner shown, having a first-hand side 20 and a second-hand side 22 which are respectively left-hand and right-hand sides in one orientation, but which become right-hand and left-hand sides when the electronic controller 10 is rotated 180 degrees. The first-hand side 20 and the second-hand side 22 of the housing both have rounded profiles 24 which particularly facilitate a user's holding and operating the electronic controller 10.

Figure 3A:
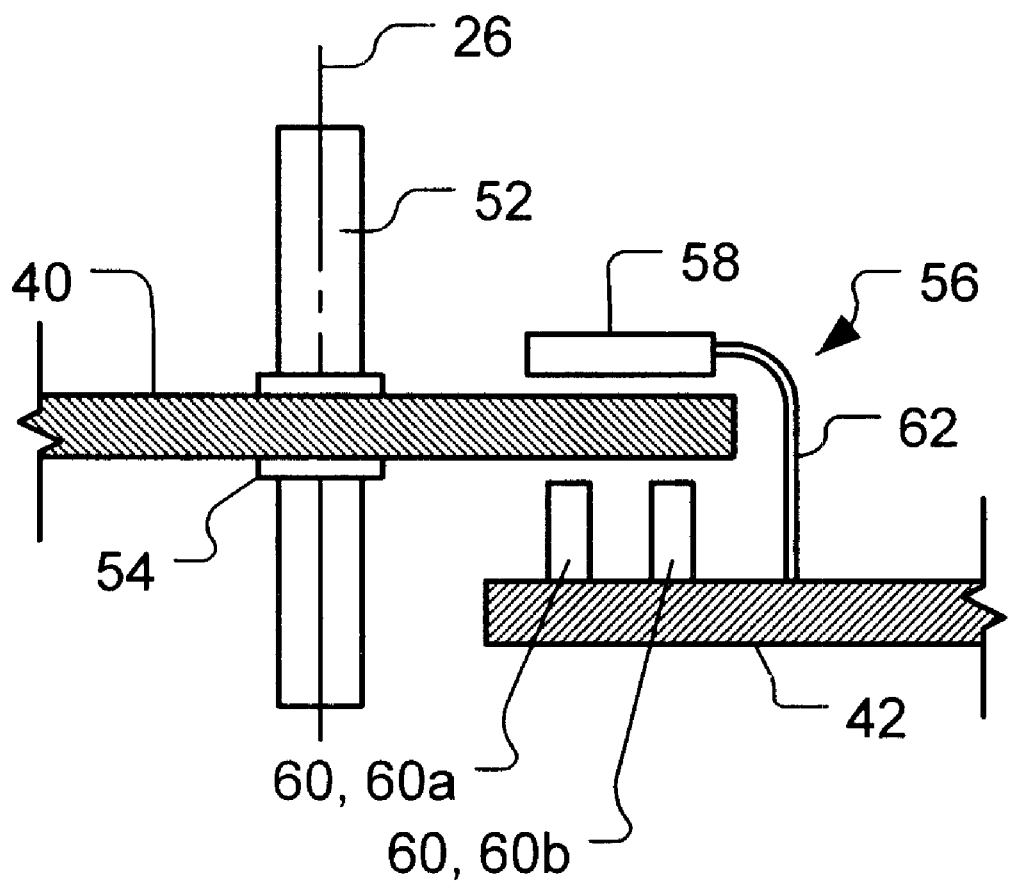
FIG. 3a–b depict details of the position detector mechanisms used in the electronic controller, with FIG. 3a being a partial side view of an overall such mechanism and FIG. 3b being a top plan view of a code wheel component used in such mechanism.

The control knobs 14 may be rotated about central axes 26 (better seen in FIG. 3a). Since it is intended that the control knobs 14 be graspable for manual operation by a user, they may be sized and shaped appropriately. The control knobs 14 may, also optionally, include knurls 28 or other features which facilitate positive grasp by the user. The knurls 28 (or other features) may also provide some degree of visual feedback to the user as to relative amounts of rotation, as is possible with the radial extending knurls 28 shown in FIG. 1. In the inventors' presently preferred embodiment the control knobs 14 are not bounded in their rotation, meaning that they may be rotated endlessly either clockwise or counter-clockwise without limitation. This is a design decision, however, and is dictated by the intended applications of the electronic controller 10. Alternate embodiments can be constructed wherein the rotation of the control knobs 14 is bound, say, to 360, 270 or some other number of degrees of full "lock-to-lock" rotation.

The communications interface 16 shown in FIG. 1 is connected to the housing 12 at a central location 32. The matter of connection location is one of ergonomics and aesthetics, and in FIG. 1 has been made consistent with the generally symmetrical and orintationally changeable nature of that embodiment. The communications interface 16 might alternately connect to the housing 12 elsewhere.

The communications interface 16 shown is a completely physical variation, having a cable 34 which ends in a connector 36. The connector 36 shown in FIG. 1 is a universal serial bus (USB) type. However, alternate physical variations might employ conventional serial port protocols, using conventional DB-9 or DB-25 type connectors 36; or conventional joystick port or conventional parallel port protocols with appropriate connectors 36. Alternately, the communications interface 16 may be, at least partially, a non-physical variation. The communications interface 16 can, for instance, employ an infra-red (IR), radio frequency (RF), or other radiated signal based protocol.

The optional press controls 18 may be essentially buttons, able to reflect a pressed or not-pressed state, i.e., an ON vs. OFF or TRUE vs. FALSE set of logic states. One or more such press controls 18 may also have a toggle or latch type capability, requiring a manual first distinct press by a user to produce one logic state, and then staying in that logic state until a second distinct press causes a change to the alternate logic state. A degree of physical hysteresis may be present in the press controls 18, or the electronic controller 10 may provide an electronic pseudo hysteresis. The press controls 18 may be employed to permit a user to select operational functions in a computerized system employing the electronic controller 10 or in an application running on such a system.

Alternate versions of the press controls 18 may also produce a proportional input, although such tend to require considerable manual dexterity when operated concurrently with the control knobs 14. As can be see in FIG. 1, the press controls 18 may be symmetrically located within the housing 12 to be functionally consistent with the inter-operatable 180 degree rotate able nature of the embodiment shown.

Figure 2:
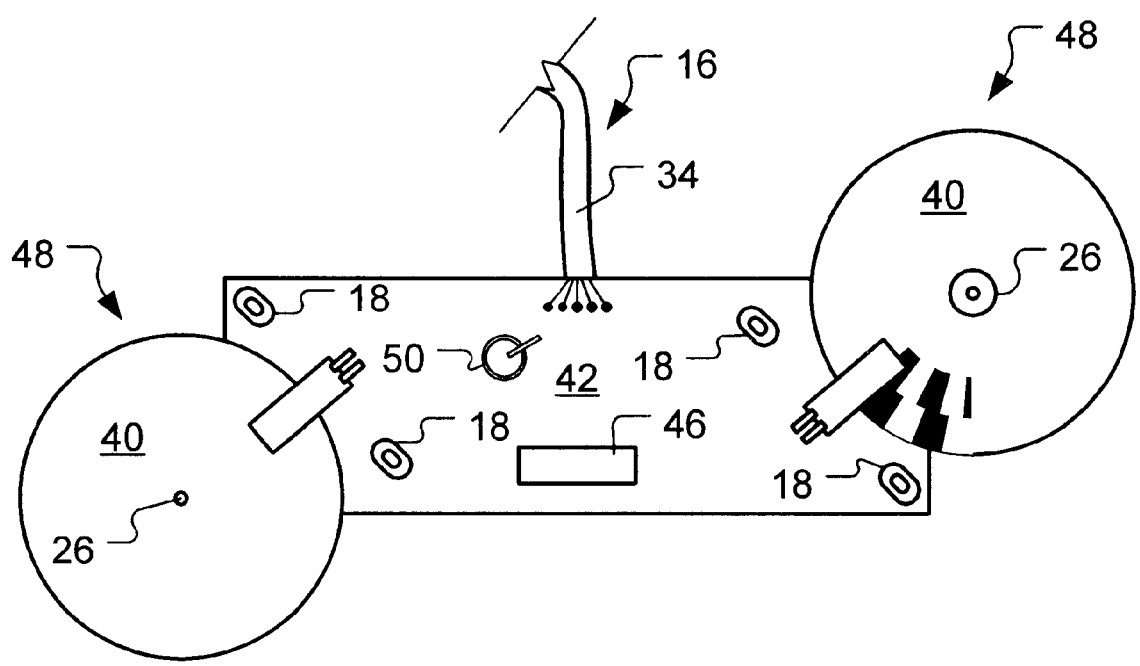
FIG. 2 is a top plan view of the electronic controller of FIG. 1, with the housing removed to particularly show the internal components.

FIG. 2 is a top plan view of the electronic controller 10 of FIG. 1, one showing the internal components with the housing 12 removed. A pair of code wheels 40 are rotatably mounted inside the housing 12. The control knobs 14 of FIG. 1 are each respectively connected to one of the code wheels 40, and thus rotate about the same central axes 26 (see also, FIG. 3a).

The other major component in FIG. 2 is a printed circuit board (PC board 42), on which a number of other components are mounted. Of course, as those skilled in the electronic arts will readily appreciate, multiple printed circuit boards might be used instead. The communications interface 16, with only part of its cable 34 shown here, connects to the PC board 42.

Mounted on the PC board 42 is a processor system 46, which controls and is able to employ the communications interface 16 to send (and in some embodiments receive) a data signal from a computerized system (not shown) which employs the electronic controller 10. In the inventors' presently preferred embodiment, the processor system 46 is a single integrated circuit (IC) part number CY7C63001A from Cypress Semiconductor Corporation of San Jose, Calif. This is a complete 8-bit micro-computer with a built in read only memory (ROM) to house the firmware, read/write random access memory (RAM) and a USB interface.

Also mounted on the PC board 42 and connected with the processor system 46 are a pair of position detectors 48, one for each code wheel 40, and each functionally including its respective code wheel 40 as is presently described. The press controls 18 are also mounted on the PC board 42, as is a tilt/shake sensor 50.

Figure 3B:
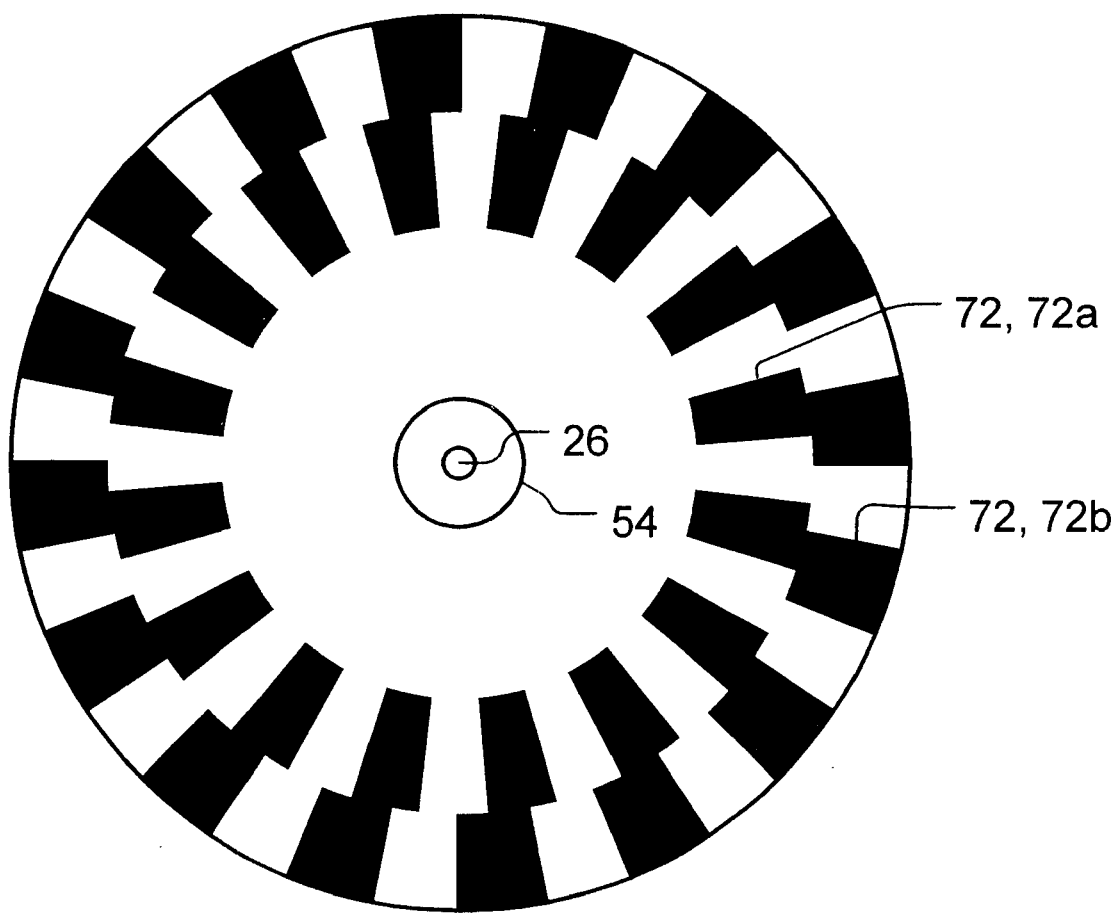

FIG. 3a–b depict details of the position detectors 48. FIG. 3a is a partial side view of one the position detectors 48 and FIG. 3b is a top plan view of a code wheel 40. FIG. 3a particularly shows the relative locations of the code wheel 40 and a light source and light sensors used to detect its location. FIG. 3a particularly shows the features of the code wheel 40 which permit resolving rotational movement and which direction it occurs in.

Turning first to FIG. 3a, the code wheel 40 is mounted on a shaft 52 at a hub 54 and rotates as a unit about the central axis 26 when a user turns the associated control knob 14 (not shown in FIG. 3, but present atop the shaft 52). As the code wheel 40 rotates it passes through a photo-diode unit 56 which is mounted on the PC board 42. The photo-diode unit 56 includes a light source 58 (i.e., an opto-emitter such as a light emitting diode (LED)) and two light sensors 60 (i.e., opto-detectors). In FIG. 3a, an inner light sensor 60a and an outer light sensor 60b are depicted. It should be noted that these are "inner" and "outer" with respect to tracks in the code wheel 40, described presently, and not with respect to their placement on the PC board 42 (which is opposite). As also shown, one light source 58 may be used for operation with both of the light sensors 60. This provides economy, but separate source-sensor pairs are also suitable. The light sensors 60 are also shown mounted directly on the PC board 42, with the light source 58 mounted on an arm 62 extending above the PC board 42 and the code wheel 40. This is an optional but desirable design choice, since in this arrangement any vibration or shock minimally affects the light sensors 60.

Turning now also to FIG. 3b, there it can be seen that the code wheel 40 includes the hub 54, an inner track 70a of opaque bars 72, and an outer track 70b of opaque bars 72. In the assembled electronic controller 10, the inner light sensor 60a aligns with the inner track 70a and the outer light sensor 60b aligns with the outer track 70b. The code wheel 40 may be a disk with the opaque bars 72 separated by windows (transparent with respect to light from the light source 58), or the code wheel 40 may be an assembly of radial extending arms wherein the opaque bars 72 are the arms and there are open regions between them through which light may pass.

Both of these approaches have advantages and disadvantages. If a disk with transparent windows is used, the windows may turn somewhat opaque over time due to chemical changes in the materials or due to dust, films, etc. depositing. However, a disk is physically rigid and robust, and is therefore much less susceptible to vibration in normal use and breaking in abnormal use. In contrast, the use of arms open regions there between ensures that light from the light source 58 will be able to pass unattenuated to the light sensors 60. However, the radial arms may easily vibrate and cause some degree of spurious light signal detection at the light sensors 60; and the radial arms may break if the electronic controller 10 is dropped or otherwise abused.

FIG. 3b also depicts how the opaque bars 72 of the inner track 70a and the outer track 70b are in alignment with the central axis 26 at the center of the code wheel 40 and are staggered. The opaque bars 72 of the outer track 70b lag those of the inner track 70a by (roughly) 90 degrees. Alternately, the opaque bars 72 of the outer track 70b may lead those of the inner track 70a by 90 degrees, either arrangement will work with appropriate signal processing.

The number of the opaque bars 72 used defines the possible rotational resolution and the staggering permits discerning the direction of such rotation. For example, using the lag arrangement depicted in FIG. 3b, if both of the light sensors 60 initially "see" light from the light source 58 and code wheel 40 is rotated such that the light seen by the outer light sensor 60b is obscured before that seen by the inner light sensor 60a, it follows that the code wheel 40 has rotated in a counter-clockwise direction. Conversely, if the inner light sensor 60a is obscured first, it follows that the code wheel 40 has rotated clockwise. Stated alternately, because the opaque bars 72 of the code wheel 40 are shifted one half bar width at a point between the two light sensors 60 the signals generated by each are a reference phase, and one that is shifted by 90 degrees. It is the relative timing of the signals that may be used to determine the direction of rotation of the code wheel 40.

The position detector 48 could also be made to work with any of a number of alternate mechanisms. For example, each position detector 48 could be implemented with two hall effect transducers placed slightly skewed relative to a radial and close by a wheel made out of magnetized rubber material, such as that commonly used for refrigerator magnets wherein the north south poles alternate around the circumference. Alternately, each position detector 48 could be implemented with a wheel having teeth, like a gear or multilobed cam, and lever activated switches could be used such that levers ride along the edge of the wheel. The switches would then be placed slightly skewed from each other relative to the phase of the tooth or cam undulations. Or each position detector 48 could be implemented with a wheel made out of metal and having a silk screened pattern to provide electrically conductive regions which two wiper contacts could sense. And yet other equivalents are also possible.

The tilt/shake sensor 50 is also a key component of the electronic controller 10. It determines if the electronic controller 10 has been physically tiled or shaken. With respect to tilting, the particular tilt/shake sensor 50 use can be chosen or set to some pre-determined angular quantity of tilt at which triggering occurs. For example, 15 degrees, 45 degrees, etc. The particular tilt/shake sensor 50 use can also be provided to trigger only if tilting is primarily along a particular axis or in one direction along an axis. Thus, in some embodiments, detectable tilting might be toward or away from a user holding the electronic controller 10, or it may occur only if tilting is either or only one of clockwise or counter-clockwise. With respect to shaking, the same principles largely apply, except that some predetermined quantity of shock force causes triggering. The particular pre-determined quantity used may be easily chosen such that simple vibration and such do not cause spurious triggering.

Various common sensors types can be used for the tilt/shake sensor 50. For example, conductive liquid sensors work well for detecting both tilting and shaking. Although not widely used today, the once common mercury switch conceptually illustrates this class of common sensor. Another suitable class of sensor for use in many embodiments of the invention is pendulum sensors. These work well for generally detecting tilting and shaking, and they work particularly well for detecting when such occurs along only some axes.

Figure 4:
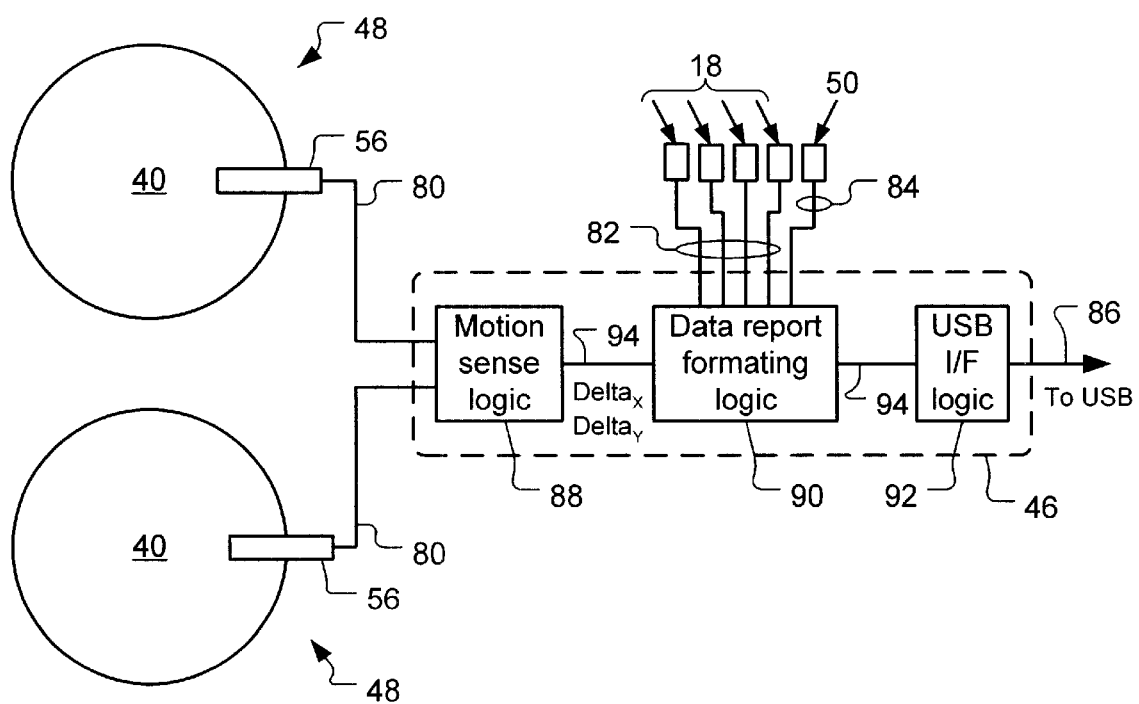
FIG. 4 is a functional block diagram of the electronic controller.

FIG. 4 is a functional block diagram of the electronic controller 10. The central element here is the processor system 46, which is shown in ghost outline to emphasize its major internal elements. The processor system 46 receives inputs from the position detectors 48 in the form of rotation signals 80. The processor system 46 also receives inputs from the press controls 18, in the form of press signals 82, and from the tilt/shake sensor 50, in the form of a tilt/shake signal 84. The processor system 46 produces a data signal 86 as output, which is communicated via the communications interface 16 to a computerized device or system (not shown) which is employing the electronic controller 10.

The major internal functional elements of the processor system 46 are a motion sense logic unit 88, a data report/format logic unit 90, and a communications logic unit 92. The motion sense logic unit 88 receives the rotation signals 80 from the position detectors 48 and determines from them the respective quantities and directions of rotation of the control knobs 14 of the electronic controller 10. This information is then communicated to the data report/format logic unit 90 via a bus 94.

The data report/format logic unit 90 receives this information and also receives the press signals 82 and the tilt/shake signal 84 and integrates this information as well. This complete set of integrated information is then communicated to the communications logic unit 92 via a bus 94 (possibly the same bus 94 previously used, but not necessarily so). At his point, except for any communications control information, all information for the data signal 86 is integrated together.

The communications logic unit 92 receives this integrated information and handles communicating it via the communications interface 16 to the target device employing the electronic controller 10. The role of the communications logic unit 92 is largely conventional, handling preparation of the data signal 86 into the desired protocol and also buffering and handshaking with the target device to ensure that the data signal 86 is successfully communicated to it.

Up to this point the implication may be that the communications logic unit 92 is strictly a transmitting unit and that a target device never communicates back with the electronic controller 10. This is not necessarily the case, however. Depending on the communications protocol used there may be bidirectional control data exchanged, including control data from the target device back to the communications logic unit 92, and back across the bus 94 to the data report/format logic unit 90 and even the motion sense logic unit 88. One example is the already noted one of handshaking signals, but other control data is also possible.

Another possibility is for the target device to instruct the electronic controller 10, and specifically the processor system 46, to perform various operations locally. Such operations might include resetting the processor system 46 or flushing data buffers, or scaling or pre-processing the various signals and information used to create the data signal 86. Such operations typically are performed in the target device, but they may also be "off loaded" to suitably capable embodiments of the electronic controller 10. For example, a software application on a target device might communicate to the electronic controller 10 that it should only note and integrate into the data signal 86 the occurrence of press type events at the press controls 18, and to ignore release type events. Or an application might instruct the electronic controller 10 that it should report no more than one tilt/shake event per second from the tilt/shake sensor 50.

Concluding now with specific discussion of the figures, it should be appreciated that the inventors' presently preferred embodiment of an electronic controller 10 has been described. That embodiment is one for full-functioned, two-handed use, wherein the two control knobs 14 permit a user to simultaneously control in two-degrees of freedom. However, a simpler embodiment might employ only one control knob 14 and position detector mechanism.

The inventors have created in the electronic controller 10 an inexpensive, dedicated, internet-enabled peripheral system that allows input to a computerized device via two rotational knobs and tilting or shaking motions. The movement of the knobs can be mapped to various desired motions, including horizontal, vertical, in-out movement in linear directions; or mapped to rotational motions, e.g., yaw, pitch, and roll; or mapped to non-movement input data ranges, such as sound volume, radio tuning frequency, color hue, light dimming, temperature selection etc.

Providing these capabilities in an input system has been missed with traditional input solutions such as the mouse, where the ability to move in the horizontal and vertical dimensions independently is lacking. Some game controllers, arguably, can provide such capabilities but not with the simplicity of hardware and elegance of the electronic controller 10.

One reason for this is that the tasks which such prior art devices were being designed for simply did not require this feature. However, because the inventors' goal was not to make these tasks more efficient, but to add a level of skill and enjoyment (i.e., to some extent to provide a toy), this led them to decompose the goal of movement back to its horizontal and vertical components by offering knobs that controlled them separately.

Another reason motivating the inventors' solution, and one missed by those working on similar systems, is that the style of input is cruder than a mouse. There is a psychological barrier for most designers to realize that a less sophisticated solution is better in some circumstances. Even more problematic is the realization that there are other goals to a design than making the task easier or more efficient. In the present case, key goals were to better represent real life, add skill, and add enjoyment for the user.

The electronic controller 10 was developed to enable a user to move the input focus on a graphical user interface (perhaps connected to the Internet) in the horizontal and vertical dimensions simultaneously and independently in a fin and entertaining way. It was also developed to represent the tilting and shaking of electronic objects in a manner that more closely resembles actions in the real world, such as the shaking of dice, erasing of a drawing board with a shaking motion, the mixing of paints, earthquake movements, etc.

The inventors' research has indicated that users have more fin performing operations like drawing and shaking dice when they can use common and intuitive physical movements. They also learn to rotate objects at a quicker pace. And they often require only one trial at learning to use the electronic controller 10 for volume control purposes (such as controlling web streaming audio).

The electronic controller 10 may be used as an Internet toy, a plaything, something to have fun with. One can play with the knobs, press controls, buttons etc. to make changes occur in a computer connected to the Internet. One can tilt or shake the electronic controller 10 to make changes happen. In a childlike manner one can dump it, tilt it, or shake it in an emotive way to cause a computer to respond in manners consistent with such physical motions, like restarting an application, erasing a display screen, shaking up a scene, or jogging an electronic object on a screen into a target position. Thus, the electronic controller 10 is usable as a toy and is a fun, novel way to interact with the computer.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present electronic controller 10 is well suited for application in controlling computerized devices. It can provide simultaneous, independent movement of a computer cursor in horizontal and vertical dimensions. It has multiple knobs that can be used simultaneously and independently. Unlike prior cursor key solutions, it can provide continuous, but not independent movement of a computer cursor in horizontal and vertical dimensions. When tilted or turned over and shaken, the electronic controller 10 controller causes a function to be performed (for example, the shaking of dice). All of these aspects are useful to perform work, particularly editing and creating graphical art work or for controlling functions like the volume and on-off status of Internet delivered streaming audio, and the inventors anticipate that the electronic controller 10 will be widely used as a tool for these and other purposes.

However, another major goal of the inventors in providing the electronic controller 10 is to provide a toy. As such, the electronic controller 10 is designed to be a fun plaything. The hardware can be picked and played with, like a toy, in order to perform object manipulation on a computer screen in an entertaining way. With the electronic controller 10, users can interact with a remote host computer, for fun and games. The electronic controller 10 adds an element of skill and therefore, fun, to drawing and games. It makes it difficult to draw a straight line and extremely hard to draw a circle. This makes its use entertaining.

A toy, according to The Random House Dictionary, is: (1) an object for a child to play with; (2) something unimportant; (3) a small article of little, real value. All of these definitions are consistent with the mission of the electronic controller 10: to provide inexpensive and accessible fun and entertainment for all.

The electronic controller 10 is the first "Internet Toy" and, as such, it defines a new category of electronic product, most closely allied to the technical field of computerized, interactive toys. With the electronic controller 10, users can interact, alone and collaboratively, with a computer connected to the Internet, for fun and games. It enables users to draw pictures on a screen, as well as perform other functions like navigating a maze through rotational movement, continuous functions such as volume on a radio tuner, and steering mechanisms.

For the above, and other, reasons, it is expected that the electronic controller 10 of the present invention will have widespread industrial applicability. Therefore, it is expected that the commercial utility of the present invention will be extensive and long lasting.

What is claimed is:

1. A controller for a user to selectively control a computerized system, comprising:
    a housing;
    a control knob rotatably mounted in said housing, wherein said control knob is suitable for manual rotation by the user with their hand;
    a position detector contained within said housing, wherein rotation of said control knob causes said position detector to produce a rotation signal, to permit detection of amounts of said manual rotation of said control knob by the user;
    a tilt sensor contained within said housing, wherein said tilt sensor is suitable for sensing tilting of said housing of the controller and producing a tilt signal, to permit sensing if the user manually tilts the controller;
    a communications interface suitable for communicating a data signal from the controller to the computerized system;
    a processor system contained within said housing, wherein said processor system is suitable for:
    receiving said rotation signal,
    determining from said rotation signal a rotation amount,
    integrating said rotation amount into said data signal,
    determining from said tilt signal whether tilting has occurred and integrating a tilt indication into said data signal, and
    directing said communications interface to communicate said data signal from the controller to the computerized system.

2. The controller of claim 1, wherein said position detector includes:
    a code wheel, wherein rotation of said control knob causes rotation of said code wheel;
    said code wheel having an inner track of opaque bars and an outer track of opaque bars and said inner track of opaque bars and said outer track of opaque bars are staggered;
    a photo-diode unit having an opto-emitter, an inner opto-detector, and an outer opto-detector;
    said opto-emitter being suitable for producing a light beam;
    said opto-detectors each being suitable for receiving a portion of said light beam and contributing data there from to said rotation signal of said position detector; and
    said code wheel and said photo-diode unit are suitably engaged such that rotation of said code wheel causes said inner track of opaque bars to controllably interrupt said light beam from reaching and being detected by said inner opto-detector and said outer track of opaque bars to controllably interrupt said light beam from reaching and being detected by said outer opto-detector, to permit resolving directions and quantities of rotation of respective said control knobs.

3. The controller of claim 1, wherein said tilt sensor is further suitable for sensing shaking of said housing of the controller and producing said tilt signal, to further permit sensing if the user manually shakes the controller.

4. The controller of claim 1, wherein said communications interface uses universal serial bus (USB) protocol.

5. The controller of claim 1, wherein said communications interface uses a member of the set consisting of serial cable protocol, parallel cable protocol, infra-red light communications protocol, and radio frequency protocol.

6. The controller of claim 1, further comprising:
    at least one press sensor suitable for manual pressing with a finger by the user, to produce a press signal; and
    said processor system is further suitable for determining from said press signal whether pressing has occurred and integrating a press indication into said data signal.

7. The controller of claim 1, wherein:
    said control knob is a first control knob and is suitable for manual rotation by the user with their left hand;
    said position detector is a first position detector;
    said rotation signal is a first rotation signal; and
    said rotation amount is a first rotation amount;
    and further comprising:
        a second control knob also rotatably mounted in said housing, wherein said second control knob is suitable for manual rotation by the user with their right hand; and
        a second position detector contained within said housing, wherein rotation of said second control knob causes said second position detector to produce a second rotation signal, to also permit detection of amounts of said manual rotation of said second control knob by the user;
    and wherein:
        said processor system is further suitable for:
            receiving said second rotation signal;
            determining from said second rotation signal a second rotation amount, and
            integrating said second rotation amount into said data signal.

8. The controller of claim 7, wherein:
    said housing includes a first housing member in which said first control knob is located and a second housing member in which said second control knob is located; and
    said first housing member is shaped as a mirror image of said second housing member, to permit the user to rotate the controller and alternately operate said first control knob with their right hand and to alternately operate said second control knob with their left hand.

9. A method for a user to selectively control a computerized system with a controller, the method comprising the steps of:
    (a) sensing shaking of the controller and producing a shake signal responsive there to when the user shakes the controller; and (b) communicating said shake signal to the computerized system as a data signal from the controller.

10. The method of claim 9, further comprising:

sensing manual pressing with a finger by the user of at least one press sensor and producing a press signal responsive there to; and integrating said press signal into said data signal for communication also to the controller.

11. The method of claim 9, wherein said step (b) uses a member of the set consisting of universal serial bus (USB) protocol, serial cable protocol, parallel cable protocol, infrared light communications protocol, and radio frequency protocol.

12. The method of claim 9, further comprising:

detecting rotation of a control knob rotatably mounted in the controller and producing a rotation signal responsive there to;

determining from said rotation signal a rotation amount which represents manual rotation of said control knob by the user with their hand; and integrating said rotation amount into said data signal for communication also to the controller.

13. The method of claim 12, wherein:

said control knob is a first control knob;

said rotation signal is a first rotation signal; and said rotation amount is a first rotation amount;

and further comprising:

detecting rotation of a second control knob also rotatably mounted in the controller and producing a second rotation signal responsive there to;

determining from said second rotation signal a second rotation amount which represents manual rotation of said second control knob by the user with their hand; and integrating said second rotation amount into said data signal for communication also to the controller.

14. A method for a user to selectively control a program running in a computerized system, the method comprising the steps of:

(a) sensing shaking of a controller and producing a shake signal responsive there to when the user shakes said controller;

(b) transmitting said shake signal to the computerized system as a data signal from said controller; and (c) receiving said data signal from said controller and instructing the program to perform actions responsive there to.

15. The method of claim 14, wherein:

said computerized system includes a first computerized device and a second computerized device connected by a network;

said step (b) includes transmitting said data signal from said controller to said first computerized device; and said step (c) includes receiving said data signal from said controller at said first computerized device and, via said network, instructing the program to perform said actions responsive there to on said second computerized device.

16. The method of claim 15, wherein said network is a global communications network.

\* \* \* \* \*